July 10, 1928.　　　　　　　　　　　　　　　　　　1,676,404
J. O. MAUBORGNE ET AL
SYSTEM OF RADIO COMMUNICATION
Filed Feb. 17, 1921　　　　2 Sheets-Sheet 1
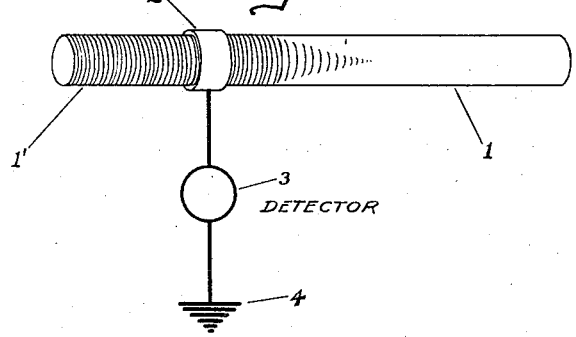
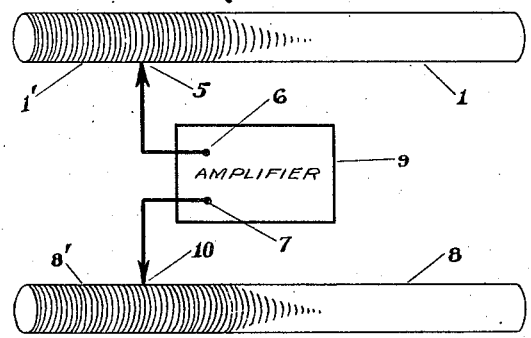
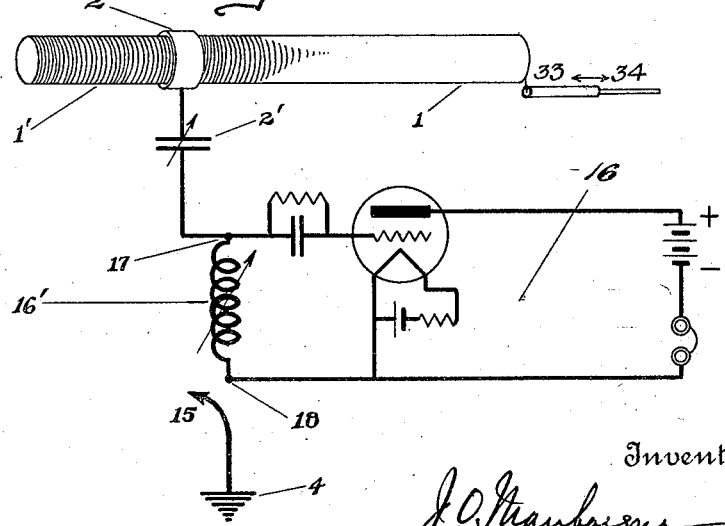
Inventor
J. O. Mauborgne
Guy Hill
By Robert H. ??? Attorney July 10, 1928.
J. O. MAUBORGNE ET AL
SYSTEM OF RADIO COMMUNICATION
Filed Feb. 17, 1921
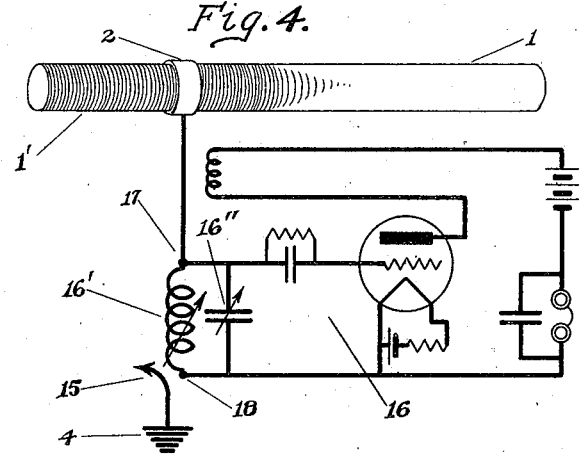
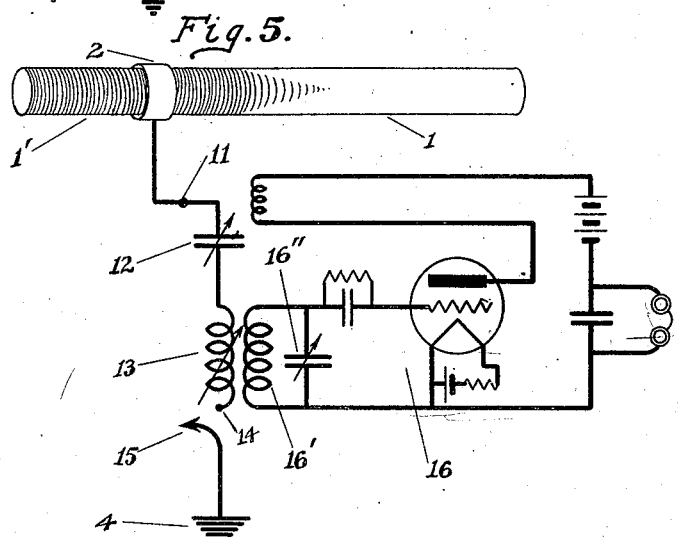
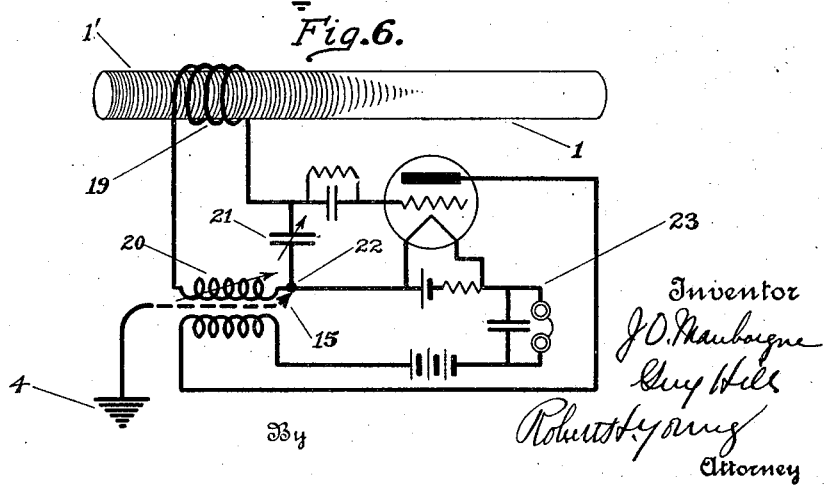

Patented July 10, 1928.

UNITED STATES PATENT OFFICE.

JOSEPH O. MAUBORGNE AND GUY HILL, OF WASHINGTON, DISTRICT OF COLUMBIA.

SYSTEM OF RADIOCOMMUNICATION.

Application filed February 17, 1921. Serial No. 445,880.

This invention relates to the art of radio signaling, and particularly transmitting and receiving radio signals, and a system for use in practicing same. The object of the present invention is to increase the strength of the signals transmitted by and received upon resonance wave coil antennæ. In our pending applications Serial No. 383,720, filed May 24, 1920, and Serial No. 389,450, filed June 16, 1920, we have described methods for receiving and transmitting radio signals in which resonance wave coils are introduced as a new type of antenna, utilizing the wave development effects produced by electrical excitation of such antenna either from a distant source in the form of electro-magnetic waves acting upon it, in which case the wave coil serves as the receiving antenna, or the wave coil may be used as a transmitting antenna by setting up electrical oscillations in the coil from a local source which may have a period of its own, in which case the coil is adjusted to be in resonance with the frequency of the oscillations of said source, or the period of the oscillations may be determined solely or mainly by the electrical constants of the coil.

The present invention utilizes the same general idea, introducing however, modifications whereby greater efficiency in transmitting and receiving is obtained. The method involves the use of an open antenna circuit in the form of a wave coil provided with a single sliding or variable electrostatic, direct, or electro-magnetic connection, to which is attached a lead to a suitable tuned or receiving set of apparatus, which, in turn, is connected either to a direct ground, a capacity ground, or a counter capacity in any of the well-known forms, or in the form of another wave coil.

The resonance wave coil, which we shall designate hereinafter simply as wave coil, is preferably in the form of a long helix uniformly wound with wire, in single or multiple layers, the electrical constants of which coil, that is, inductance, capacity and resistance, are all of a distributed character and of such magnitude as to insure a wave development along the coil for the frequencies of the signals desired to receive or transmit. However, the coil may not necessarily be of uniform section throughout its length, as for example an airplane strut may be used for the core upon which the coil is wound. The wave coil is wound with a comparatively large number of turns per unit length, the object being to secure in a relatively short coil, the equivalent condition of a long antenna in the matter of its natural electrical period.

We have found that this form of antenna, when taken in conjunction with its sliding contact and the lead through said sliding contact to the receiving apparatus, constitutes an antenna system, operating at a fundamental period or periods which, so far as the antenna itself is concerned, depend principally upon the position of the slider on the coil and the electrical constants of the coil itself between the point of contact with the slider and either end of the coil.

This may be made clearer by the following statements:

When either a transmitting set or a receiving set is connected to the middle point on the coil, the connection may be any of the well-known forms, such as direct or electrostatic; both halves of the coil having exactly the same electrical characteristics, they will both respond to the impressed electro-motive force and oscillate with the same frequency. If, however, the connection of the transmitter or the receiver is shifted on either side of the central point of the coil, the two parts of the coil will each have different electrical characteristics, and therefore respond to different wavelengths, corresponding to the natural periods of the said two parts of the coil. By adjusting the tuned set to either one of the two parts of the coil, the energy may be either transmitted or received on either part of the coil, that is to say, only that part of the coil is effective in either transmitting or receiving which is in resonance with the set to which it is tuned.

The principle of operation and the method of using our invention can better be understood by reference to the accompanying diagrammatic fiugres which show practical embodiments of the invention and form part of this specification. In all of the figures herewith, the same symbols and nomenclature are used to designate the same apparatus and therefore reference to the various common symbols will not be repeated except in cases where it is necessary to make clear the difference between the various figures.

Figure 1 is a diagrammatic view of one form of the device used for the reception of radio signals in which one point of the detector is connected electro-statically to the wave coil, the other terminal of the detector being grounded.

Figure 2 shows an arrangement in which the multi-stage amplifier is used and another wave coil used as counterpoise.

In Figure 3 a detector is connected across a variable inductance which is in turn connected through a condenser to the sliding ring.

In Figure 4 an arrangement is shown in which the tuned receiving system is connected to the wave coil antenna and may or may not be connected to ground.

Figure 5 differs from Figure 4 in that a coupled tuned receiving system is employed.

Figure 6 illustrates an arrangement in which the receiving apparatus is coupled electro-magnetically to the wave coil.

Having more particular reference to the drawings, and to Figure 1, 1 and 1′ represent a wave coil, 2, is a metal ring sliding on the said wave coil and insulated from it. 3, is a detector which may be of any of the well-known types used in practice. 4, indicates a ground connection. The operation is as follows:

When electro-magnetic waves due to an incoming signal act on the wave coil and the slider 2 is adjusted so that one part of the coil which may, for illustration be indicated in this diagram by 1, is in resonance with the frequency of the incoming signal a large response in the detector 3 is obtained.

It is also obvious that if an electro-magnetic wave of a frequency corresponding to the natural period of the part 1′ of the coil is acted upon the said coil with the detector will also respond to that electro-magnetic wave as well. This feature would be of advantage in case a receiving station was listening for calls from two transmitting stations of different wavelength, then by accurately proportioning the coil, the position of the slider 2 can be so adjusted that the coil may be simultaneously adjusted for the two stations or the two wavelengths from a single station which it is desired to receive.

In the embodiment of the invention shown in Figure 2 a multi-stage amplifier, designated by 9, is shown, the input grid terminal 6 of which is connected directly at a point 5 to the wave coil 1—1′, and the filament connection 7 is connected to a point 10 on the coil 8—8′. The coil 1—1′ serves as the receiving antenna and the connected point 5 is adjusted on the said coil 1—1′ so as to bring one part of said coil into resonance with the frequency of the received signal. Wave coil 8—8′ is used as a counterpoise and for best operation it is essential that the connecting point 10 on the coil 8—8′ should be properly adjusted with relation to the wavelength desired to be received.

According to Figure 3 an arrangement is shown in which a variable inductance 16′ is connected to the sliding ring 2 on the wave coil 1—1′; the detector 16 being operatively associated with the said inductance 16′; one terminal 18 of the said variable inductance may be connected or not as desired to the ground 4 by means of the lead 15. In this arrangement of the coil, by grounding the coil, a high potential may be obtained across the coil and thus increase the efficiency of the system. It is sometimes preferable to introduce a variable condenser 2′ between the sliding ring 2 and the coil 16′.

Another embodiment of the invention is shown in Figure 4 in which a tuned circuit consisting of 16′ and 16″ is connected to the sliding ring 2 at a point 17 and a suitable detector 16 operatively associated with the said tuned circuit. The tuned circuit 16—16′ may be grounded by connecting the point 18 through the lead 15 to ground 4. It is preferable to use an audion detector associated with suitably regenerative arrangements for the purpose of increasing the strength of the received signal and for the purpose of effecting beats of the undamped signals which are being received. If desirable, a separate heterodyne can be used to accomplish the same purpose, that is, increasing the strength of signals or effecting beats in the reception of undamped waves.

The modification shown in Figure 5 consists in introducing a variable inductance 13 and variable condenser 12, connected in series and connected to the sliding ring 2; the secondary circuit comprising a variable inductance 16′ and variable condenser 16″ and operatively associated with a suitable detector is coupled to the said variable inductance 13. The variable inductance 13 may be grounded at the point 14 by connecting the point 14 through the lead 15 to the ground 4. We find that when the ground connection is left on that the coil 13 affects the tuning of the system very little and its functioning is simply as a means for coupling the wave coil 1—1′ to the secondary oscillator circuit 16′—16″. With this arrangement very effective tuning is obtained and a high sensitivity.

According to Figure 6 a tuned circuit comprising a variable inductance 20, and variable condenser 21 is connected electromagnetically to the wave coil 1—1′ through the coil 19 through the wave coil 1—1′ and a suitable detector system 23 comprising regenerative arrangements is associated with the said circuit 19—20—21. The said circuit 19—20—21 may be connected at the point 22 through the lead 15 being connected to ground 4.

As shown in Fig. 3 the wave coil antenna may also leave a short length of wire or a small metal tube 34, which is connected at a point 33 to one end of the wave coil 1—1′.

It was found that by the addition of a short length of wire, or small tubes indicated here by 34, a considerable change in the natural period of the coil is effected, thus increasing the wave length range of the coil, and offers at the same time a simple means for tuning this wave coil as an antenna by varying the length of wire or tube 34. In practice it is preferable to substitute for the short length of wire 34, a telescopic metal tube, as indicated in the figure, the length of which being varied changes the tuning of the wave coil 1—1' without varying the position of slider 2. This method of tuning becomes very desirable where only a few taps are brought out from the winding of the wave coil as in the case of some comparatively large wave coils for transmitting purposes. It is evident that if slider 2 is at the center of coil 1—1' it might be desirable to have a wire or telescopic tube attached to each end of the coil.

In all instances in the specification and in the accompanying figures where the word "earth connection" or "ground" has been used, it is to be understood that any form of earth connection ordinarily employed, is included, such as, for instance, a direct connection to earth, a connection to a wave chute consisting of bare wires on the earth or buried in the earth, or a connection to insulated wires placed on or above the earth which may or may not form a counterpoise.

If this wave coil antenna is used on an airplane it is understood that the word "ground" refers to those metal parts of the plane to which the ground lead of the receiver or transmitter may be connected. While the wave coil has been described in the above specification "as consisting of a long helix of wire uniformly wound in single or multiple layers, the electrical constants of which coil, inductance, capacity and resistance, are all of a distributed character and of such proportions as to insure a wave development along the coil for the frequency of the signals desired to receive or transmit", nevertheless the form of the coil and the uniformity of its winding may be considerably deviated from without departing from the spirit and scope of our invention. For example, this wave coil may consist of a number of turns of wire wound on a strut or struts or other convenient parts of an airplane or it may be wound about any body if suitably insulated from it, such as around a portion of the fuselage of an airplane, the body of a tank, the shell of a torpedo, etc.

Furthermore, while in the figures the form of the wave coil has been diagrammatically shown as being comparatively small in size, it is to be understood that the drawings and specifications do not place any limitations upon the size and form of such a coil. If high power stations require antennæ in limited space, this form of coil antenna will be of particular advantage, and the coils may reach considerable magnitude.

We claim:

1. A system for receiving radio signals comprising a wave coil antenna upon which signals are directly received, means for detecting said signals, one terminal of said detecting means being connected to an adjustable metal ring slidable along said wave coil and capacitively connected therewith, the other terminal of said detecting means being grounded.

2. A system for receiving radio signals comprising a wave coil antenna both ends of which are entirely free from any connection to ground upon which signals are directly received, means for detecting said signals, said detecting means being electrically connected to said wave coil and associated with a ground connection.

3. A system for receiving radio signals comprising a wave coil antenna upon which signals are directly received, a three electrode electron tube detector having grid, filament, and plate electrodes, said grid electrode being connected to a selected point along said wave coil, said coil being free from any other connections.

4. A system for receiving radio signals comprising a wave coil antenna upon which signals are directly received, the terminals of said wave coil being free from any electrical connections, means for detecting said signals, said detecting means being operatively associated through tuning elements with a single point along said wave coil.

5. A system for receiving radio signals comprising a wave coil antenna upon which signals are directly received, the terminals of said wave coil being free from any electrical connections, means for detecting said signals, said detecting means being operatively associated through tuning elements with said wave coil, one terminal of said detecting means being connected with a single selective point on said wave coil and the other terminal of said detecting means being grounded.

6. In a system for receiving radio signals, a wave coil antenna upon which signals are directly received, means for detecting said signals, means for varying the range of wave lengths of said antenna consisting in a metallic conductor of variable length having one end associated electrically with said antenna, one terminal of said detecting means having an adjustable connection intermediate of the ends of said wave coil.

7. In a system for receiving radio signals, a wave coil antenna upon which signals are directly received, means for detecting said signals, means for varying the range of wave lengths of said antenna consisting in a metallic conductor of variable length having one end electrically associated with one end of said antenna, one terminal of said detecting means having an adjustable connection intermediate of the ends of said wave coil.

8. In a system for receiving radio signals, a wave coil antenna upon which signals are directly received, means for detecting said signals, means for varying the range of wave lengths of said antenna consisting in a metallic conductor of variable length having one end associated electrically with one end of said antenna, the other end of said conductor being free, one terminal of said detecting means having an adjustable connection intermediate of the ends of said wave coil.

9. In a system for receiving radio signals, a wave coil antenna upon which signals are directly received, means for detecting said signals, means for varying the range of wave lengths of said antenna consisting in a metallic conductor of variable length having one end associated electrically with one end of said antenna, the other end of said conductor being free, said antenna and said conductor both being ungrounded, one terminal of said detecting means having an adjustable connection intermediate of the ends of said wave coil.

10. A radio receiving system comprising in combination an electron tube detector having grid, filament, and plate electrodes, a wave coil antenna having uniform distributed inductance and capacity and having sufficient length in relation to the frequency of the signal to be received to insure wave development thereon, the terminals thereof being free-ended, a metallic ring arranged to be selectively adjusted along the length of said wave coil, and a connection between said metallic ring and the grid electrode of said electron tube detector.

11. A radio receiving system comprising in combination an electron tube detector having grid, filament, and plate electrodes, a wave coil antenna having uniform distributed inductance and capacity and having sufficient length in relation to the frequency of the signal to be received to insure wave development thereon, the terminals thereof being free-ended, an additional conductor of adjustable length being connected with said wave coil for the purpose of varying the capacity of said wave coil, and a single adjustable connection from said wave coil to the grid electrode of said electron tube detector.

J. O. MAUBORGNE.
GUY HILL.